(12) United States Patent
Cp

(10) Patent No.: US 11,597,024 B2
(45) Date of Patent: Mar. 7, 2023

(54) APPARATUS FOR ARC WELDING AND METHOD OF USING THE SAME

(71) Applicant: Rosemount Aerospace Inc., Burnsville, MN (US)

(72) Inventor: Nagabhushan Cp, Karnataka (IN)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 533 days.

(21) Appl. No.: 16/655,753

(22) Filed: Oct. 17, 2019

(65) Prior Publication Data

US 2021/0053133 A1    Feb. 25, 2021

(30) Foreign Application Priority Data

Aug. 21, 2019    (IN) .............................. 201911033678

(51) Int. Cl.

| B23K 9/028 | (2006.01) |
| B23K 9/00 | (2006.01) |
| B23K 9/167 | (2006.01) |
| B23K 9/29 | (2006.01) |
| B23K 35/22 | (2006.01) |
| B23K 37/04 | (2006.01) |

(52) U.S. Cl.
CPC ............ B23K 9/028 (2013.01); B23K 9/0026 (2013.01); B23K 9/1675 (2013.01); B23K 9/296 (2013.01); B23K 35/222 (2013.01); B23K 37/04 (2013.01)

(58) Field of Classification Search
CPC .... B23K 9/028; B23K 9/0052; B23K 9/0282; B23K 9/0026; B23K 9/1675; B23K 9/296; B23K 9/326; B23K 35/222; B23K 37/04; B23K 9/022; B23K 11/04; B23K 20/06
See application file for complete search history.

(56) References Cited

U.S. PATENT DOCUMENTS

| 3,391,558 A | * | 7/1968 | Deeg ...................... B21D 26/14 |
| | | | 72/56 |
| 4,243,868 A | | 1/1981 | Graham |
| 4,372,474 A | * | 2/1983 | Taff ...................... B23K 9/0286 |
| | | | 219/60 A |
| 4,803,339 A | | 2/1989 | Gordon et al. |

(Continued)

FOREIGN PATENT DOCUMENTS

| CN | 205428680 U | 8/2016 |
| DE | 3613706 C1 | 4/1987 |
| KR | 101615918 B1 | 4/2016 |

OTHER PUBLICATIONS

Dr.-Ing.H. Zurn, "WIG-Schutzgasschweiβen mit Mehrfachkathodenanordung", Schweia en und Schneiden, vol. 18, No. 5, May 1, 2066, 1 page.

(Continued)

*Primary Examiner* — Brian W Jennison
(74) *Attorney, Agent, or Firm* — Cantor Colburn LLP

(57) ABSTRACT

Disclosed is an apparatus for arc welding, comprising: a torch body comprising a power supply line and a gas supply line; two or more metal segments movable relative to one another being sized and shaped to surround a seam between two elongated objects to be welded together, the two or more metal segments being in electrical communication with the power supply line; and a gas jacket attached to each of the metal segments.

10 Claims, 2 Drawing Sheets

(56) References Cited

U.S. PATENT DOCUMENTS

| | | | |
|---|---|---|---|
| 4,810,848 A * | 3/1989 | Kazlauskas | B23K 9/0286 |
| | | | 219/60 A |
| 4,841,115 A * | 6/1989 | Severin | B23K 9/0286 |
| | | | 219/60 A |
| 5,440,090 A | 8/1995 | Davis et al. | |
| 5,586,460 A * | 12/1996 | Steingroever | B21D 26/14 |
| | | | 29/419.2 |
| 5,686,002 A | 11/1997 | Flood et al. | |
| 5,710,403 A | 1/1998 | Jusionis | |
| 5,841,089 A | 11/1998 | Martinenas | |
| 6,380,505 B1 * | 4/2002 | Stoops | B23K 37/0533 |
| | | | 219/60 A |
| 7,170,032 B2 | 1/2007 | Flood | |
| 9,950,394 B2 | 4/2018 | Barhorst et al. | |
| 10,112,268 B2 | 10/2018 | Amata et al. | |
| 2006/0076320 A1 | 4/2006 | Watanabe et al. | |

OTHER PUBLICATIONS

Extended European Search Report issued in Application No. 19212063.2 dated Jul. 21, 2020, 9 pages.

* cited by examiner

APPARATUS FOR ARC WELDING AND METHOD OF USING THE SAME

BACKGROUND

Exemplary embodiments pertain to the art of arc welding, and more particularly, to an apparatus for gas tungsten arc welding and methods of using the same.

Gas tungsten arc welding is a welding process in which an electric arc forms between a non-consumable metal electrode and the workpiece metal(s), which heats the workpiece metal(s), causing them to melt and join. Along with the electrode, a shielding gas feeds through the welding torch, which shields the process from contaminants in the atmosphere. A constant current, direct current power source is most often used, but constant voltage systems, as well as alternating current, can be used as well.

Arc welding via a singular, localized electrode often involves significant rotation, e.g., rotation of the welding apparatus itself and/or the object being welded, in order to complete a given welding task. Accordingly, significant time and skill is also needed to complete said welding task.

Therefore, there is a need to develop an apparatus for gas tungsten arc welding, and methods of using the same, which reduce both the time and skill involved in arc welding.

BRIEF DESCRIPTION

Disclosed is an apparatus for arc welding, comprising: a torch body comprising a power supply line and a gas supply line; two or more metal segments movable relative to one another being sized and shaped to surround a seam between two elongated objects to be welded together, the two or more metal segments being in electrical communication with the power supply line; and a gas jacket attached to each of the metal segments.

Also disclosed is a method of arc welding using the apparatus, the method comprising: moving the metal segments relative to one another to surround the seam between the two elongated objects to be welded; passing shielding gas through the gas jacket; applying an electric current to the metal segments, thereby creating an electrical arc between the metal segments and the two elongated objects to be welded.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
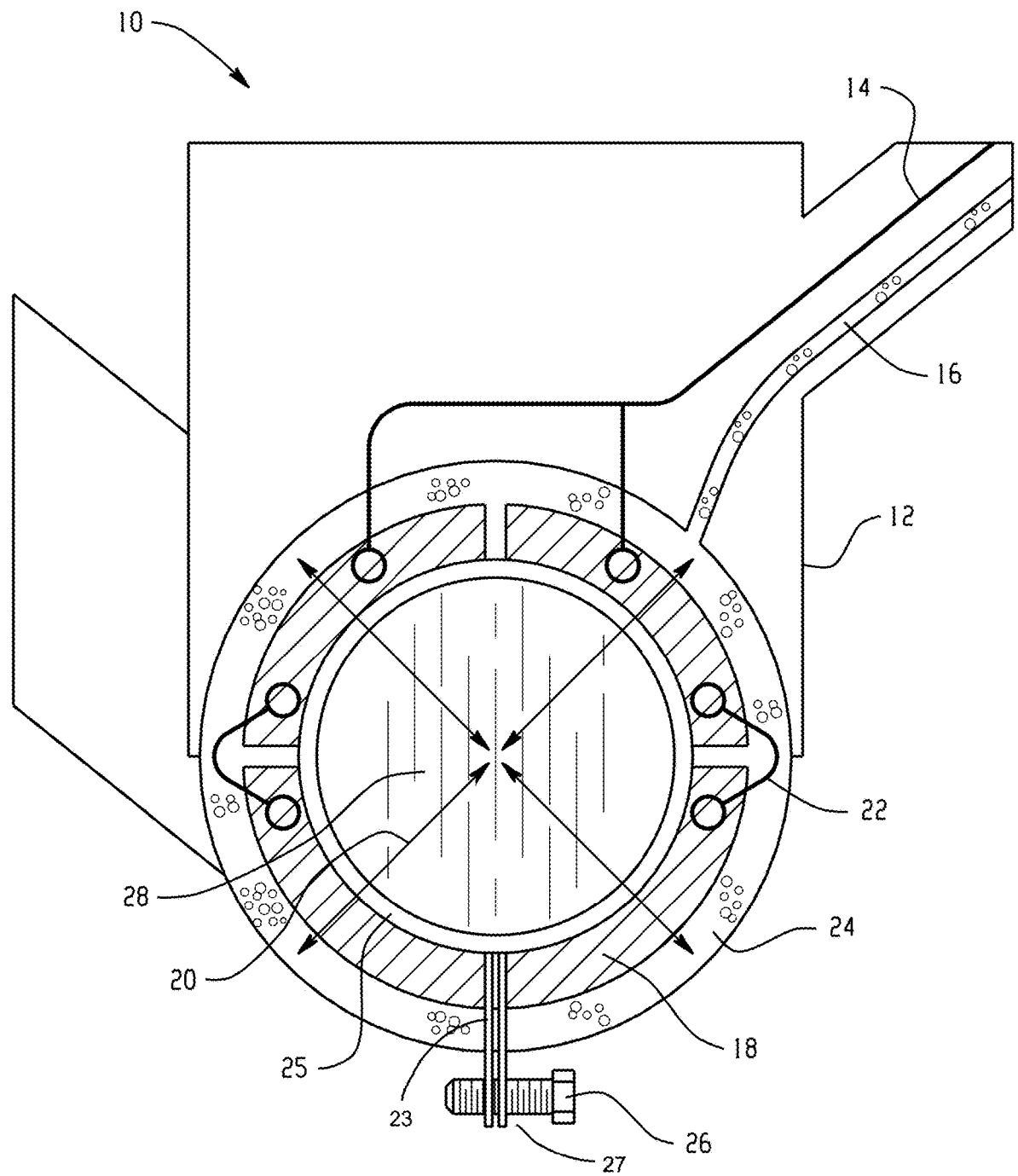
FIG. 1 is a simplified diagram of an apparatus for arc welding according to an exemplary embodiment.

Referring to FIG. 1, an apparatus 10 for arc welding, according to one embodiment, comprises a torch body 12. For example, the torch body 12 can comprise a power supply line 14 and a gas supply line 16. For example, the power supply line 14 can run through the torch body 12. The as supply line 16 can also run through the torch body 12.

The apparatus 10 for arc welding, according to one embodiment, comprises two or more metal segments 18. The metal segments 18 act as electrodes in the arc welding apparatus 10. The metal segments 18 can be separate and distinct from each other. Together the metal segments 18 can form an elliptical or polygonal shape, for example, a circle, oval, square, or triangle shape. In one embodiment, metal segments 18 can be curved, for example, the curved metal segments 18 can be formed by taking a circular, ring-like piece of metal and breaking it up into the two or more distinct curved metal segments 18. The metal segments 18 can different from each other in size and shape, or alternatively, the metal segments 18 can be equal to each other in size and shape. In one embodiment, the apparatus 10 comprises three metal segments 18. In one embodiment, the apparatus 10 comprises four metal segments 18. The metal segments 18 can comprise any suitable alloy metal electrode for gas tungsten arc welding, for example, the metal segments 18 can comprise any tungsten alloy. Adjacent metal segments 18 can be spaced about 1 millimeter to about 100 millimeters apart depending on the size of the desired welding object(s), for example, about 5 millimeters to about 15 millimeters apart, for example, about 5 millimeters to 10 millimeters apart.

Figure 2:
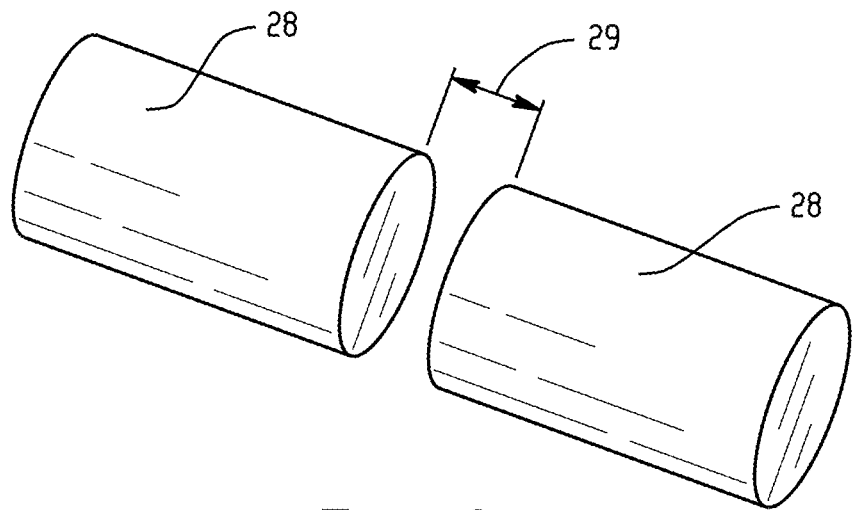
FIG. 2 is a simplified diagram of two elongated objects to be welded according to an exemplary embodiment.

The metal segments 18 are movable relative to one another, for example, movable in a radial direction 20. For example, as the metal segments 18 move in a radial direction, the elliptical or polygonal shape formed by the metal segments 18 can expand and/or contract creating a larger or smaller elliptical or polygonal shape as needed to fit a desired welding object(s) 28. For example, referring to FIG. 2, the metal segments 18 can be movable relative to one another, being sized and shaped to surround a seam 29 between two elongated objects 28 to be welded together.

In one embodiment, the metal segments 18 can be adjusted in a radial direction via a screw mechanism 27. For example, the metal segments 18 can be adjusted in a radial direction via a leadscrew, for example, a mechanical guided leadscrew 26. The apparatus 10 can further comprise a locking mechanism 23 located between two or more adjacent metal segments 18. The locking mechanism can maintain a given position of the metal segments 18.

An electric current 22 can be in communication with the power supply line 14 and the metal segments 18, for example, the electric current 22 can run through the torch body 12 from the power supply line 14 to the metal segments 18. The electric current can be a direct current or an alternating current.

The apparatus 10 for arc welding, according to one embodiment, can comprise a gas jacket 24 attached to each of the metal segments 18. The gas jacket 24 can also surround and seal the seam 29 between the welding objects 28. The gas jacket 24 thereby allows control of the welding environment. The apparatus 10 can comprise a shielding gas in communication with the gas supply line 16 and the gas jacket 24, for example, the shielding gas can run through the torch body 12 from the gas supply line 16 to the gas jacket 24, passing through the gas jacket 24. Shielding gas protects the welding area from atmospheric gases such as nitrogen and oxygen, which can cause fusion defects, porosity, and weld metal embrittlement if they come in contact with the welding object 28. The shielding gas can be an inert gas, an active gas, or a combination thereof. For example, the shielding gas can be helium, neon, argon, krypton, xenon, radon, or a combination thereof.

Figure 3:
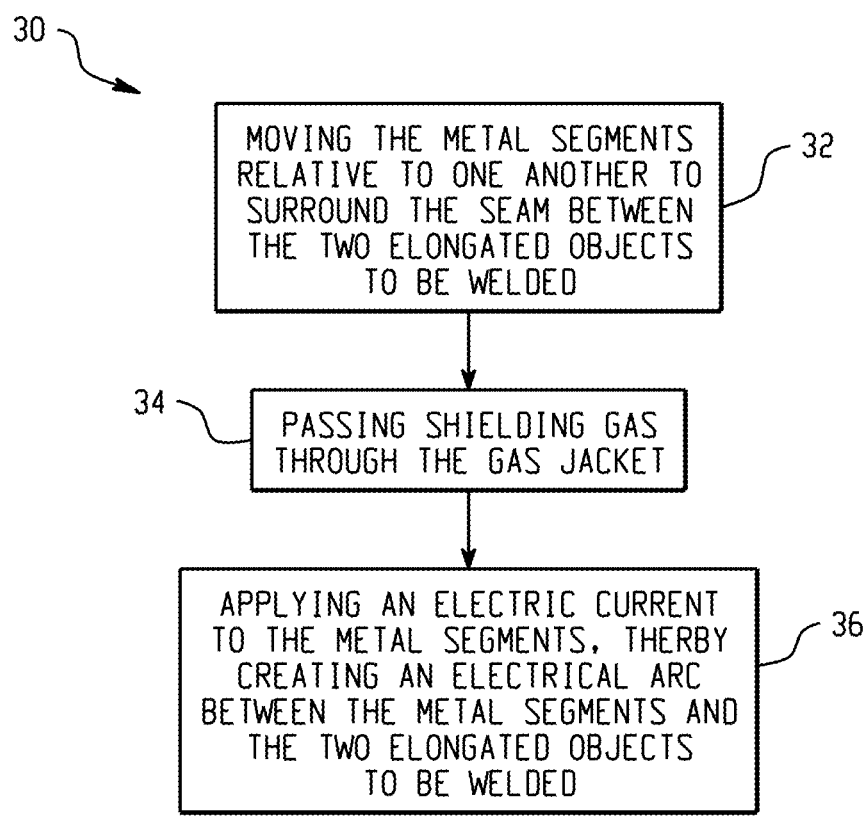
FIG. 3 is a method flow chart for a method of arc welding according to an exemplary embodiment.

Referring to FIG. 3, a method 30 for arc welding, according to one embodiment, comprises step 32: moving the metal segments 18 relative to one another to surround the seam 29 between the two elongated objects 28 to be welded.

The method 30 for arc welding further comprises step 34: passing shielding gas through the gas jacket 24, for example, via the gas supply line 16.

The method 30 for arc welding further comprises step 36: applying an electric current 22 to the metal segments 18, thereby creating an electrical arc 25 between the metal segments 18 and the two elongated objects 28 to be welded. For example, the electrical arc 25 can be created between the welding objects 28 and all of the curved metal segments 18 simultaneously. The application of the electrical arc 25 to the welding objects 28, at the seam 29, is what accomplishes the welding of the objects 28 together. In an embodiment, the electrical arc 25 can fully surround the seam 29 between the two welding objects 28 (as seen in FIG. 1), thereby allowing welding to occur fully around the seam 29 all at once.

Welding of the welding objects 28 can be completed in less than or equal to 10 seconds, for example, less than or equal to 5 seconds, for example, less than or equal to 3 seconds depending on the size of the seam 29 and/or the welding objects 28. In one embodiment, the method 30 for arc welding may or may not comprise rotation of the metal segments 18 via rotation of the torch body 12. In another embodiment, the method 30 for arc welding does not comprise rotation of the welding objects 28. Accordingly, an apparatus for gas tungsten arc welding, and methods of using the same, as disclosed herein, reduce both the time and skill involved in arc welding.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An apparatus for arc welding, comprising:
    a torch body comprising a power supply line and a gas supply line;
    two or more curved metal segments acting as electrodes movable relative to one another being sized and shaped to surround a seam between two elongated objects to be welded together, the two or more curved metal segments being in electrical communication with the power supply line; and
    a gas jacket attached to each of the curved metal segments; and
    a locking mechanism that is located between two or more adjacent curved metal segments and that moves all of the curved metal segments in a radial direction relative to one another via a screw mechanism.

2. The apparatus of claim 1, further comprising a shielding gas in communication with the gas supply line and the gas jacket, wherein the shielding gas is an inert gas, an active gas, or a combination thereof.

3. The apparatus of claim 2, wherein the shielding gas is helium, neon, argon, krypton, xenon, radon, or a combination thereof.

4. The apparatus of claim 1, wherein the curved metal segments are equal to each other in size and shape.

5. The apparatus of claim 1, wherein the apparatus comprises three curved metal segments.

6. The apparatus of claim 1, wherein the apparatus comprises four curved metal segments.

7. The apparatus of claim 1, wherein the curved metal segments form an elliptical shape.

8. The apparatus of claim 1, wherein the curved metal segments comprise tungsten, tungsten alloy, or a combination thereof.

9. The apparatus of claim 1, wherein the curved metal segments are moveable in a radial direction via a leadscrew.

10. The apparatus of claim 1, wherein adjacent curved metal segments are spaced about 1 millimeter to about 100 millimeters apart.

* * * * *